Patented Nov. 4, 1952

2,616,917

UNITED STATES PATENT OFFICE 2,616,917

ALKYL STYRENE SULFONATES AND PROCESS FOR THEIR PRODUCTION

Harry W. Coover, Jr., and Joseph B. Dickey, Rochester, N. Y., assignors to Eastman Kodak Company, Rochester, N. Y., a corporation of New Jersey No Drawing. Application November 8, 1949,
Serial No. 126,259

14 Claims. (Cl. 260—456)

This invention relates to alkyl styrene sulfonates wherein the alkyl sulfonate group is attached to a nuclear carbon atom, to polymers thereof, and to processes for their preparation.

The new compounds of the invention can be represented by the structural formula:

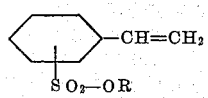

wherein R represents an alkyl group containing from 1 to 18 carbon atoms. The above-defined new compounds are water-white liquids to viscous oils, the viscosity increasing progressively with increasing carbon chain length of the alkyl group R. They are valuable intermediates for the preparation of other useful organic compounds and, in addition, they are polymerizable alone or conjointly with one or more other unsaturated and polymerizable organic compounds, in the presence of polymerization catalysts, to resinous compounds which because of their relatively high softening points, clarity, flexibility and toughness make them especially valuable molding, casting, film and fiber-forming materials.

Alkyl styrene sulfonates wherein the alkyl styrene sulfonate group is attached to a nuclear carbon atom have not been described heretofore. The prior art describes only certain polymeric nuclear sulfonated styrenes which have been prepared from polystyrenes. For example, W. Beuers et al., United States Patent 2,031,929, dated February 25, 1936, showed polystyrene sulfonic acids, and salts thereof, prepared by first polymerizing the styrene and then sulfonating the resulting high molecular weight polymer. However, such prior art processes are very cumbersome of application and the resulting products are obtained in low yield, are of indeterminate chemical structure, contain considerable undesirable reagent impurities and are not easily duplicated in commercial practice. Also such prior art nuclear sulfonated polystyrenes would be very difficult of conversion to even the simplest alkyl esters. The high viscosity of the polymers would require their dispersion in solvents in impractical dilution, and the sulfonic acid groups would first have to be converted to a metal salt, for example, to a silver salt for reaction with alkyl halides, to an alkali metal salt for reaction with methyl sulfate, etc., but in any such contemplated process the isolation of a satisfactory, uniform product in good yield would entail insurmountable difficulties. Another disadvantage of such prior art processes is that they cannot be employed for the preparation of certain desirable copolymers. For example, when a copolymer of styrene and acrylonitrile is sulfonated, the nitrile groups are hydrolyzed to the amide, and when a copolymer of styrene and methyl methacrylate is sulfonated the ester groups are hydrolyzed leaving in place of the ester groups methacrylic acid groups on the resin molecule. Other copolymers of styrene with unsaturates containing acid hydrolyzable groups behave similarly. The monomeric compounds of the invention, on the other hand, can be smoothly and efficiently homopolymerized or copolymerized to the desired high quality resinous products in high yields and with none of the aforementioned disadvantages.

It is, accordingly, an object of the invention to provide a new class of polymerizable organic compounds of the styrene series. Another object is to provide new homopolymers and copolymers. A further object is to provide methods for preparing the new monomers and polymers. Other objects will become apparent hereinafter.

In accordance with the invention, the new monomeric alkyl styrene sulfonates are prepared by reacting a halosulfonylphenyl ethyl halide which can be represented by the general formula

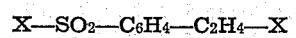

wherein X represents a chlorine atom or a bromine atom, with a saturated monohydroxy aliphatic alcohol which can be represented by the general formula R—OH, wherein R has the meaning as previously defined, in the presence of at least two molecular equivalents of a base compound selected from the group consisting of basic salts of the alkali and alkaline earth series (e. g. sodium or potassium hydroxide, sodium or potassium carbonate, sodium or potassium acetate, calcium or magnesium hydroxide, calcium or magnesium carbonate, etc.) and organic tertiary amines of the aliphatic, aromatic and heterocyclic series (e. g. trimethylamine, triethylamine, dimethylaniline, pyridine, quinoline, isoquinoline, etc.). The reaction can be carried out with the reagents per se, but advantageously the halosulfonylphenyl ethyl halide is dissolved in an excess of the alcohol to be reacted therewith or dissolved in an inert solvent medium such as diethyl ether, isopropyl ether, dioxane, petroleum ether or other low boiling hydrocarbons, benzene, toluene, etc. Advantageously the desired alcohol selected from the series

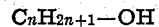

wherein $n$ represents a whole number from 1 to 18 (e. g. methanol, ethanol, isopropanyl, $n$-propanol, $n$-butanol, $n$-octanol, etc.) is added to the halosulfonylphenyl ethyl halide with stirring, followed by the addition to the mixture of the base compound which is preferably dissolved in water or alcohol or in an aqueous alcohol mixture. The alkyl styrene sulfonate which forms can be isolated by conventional methods from the reaction mixture, for example, by water extraction of the water-soluble salts contained in the reaction mixture, followed by fractionation of the residual extracted material. Advantageously, the mixture is neutralized before or after the extraction step with water. Where ether is employed as the solvent medium for the reaction, a convenient method to separate the product is to pour the reaction mixture into a larger volume of water, neutralize the aqueous mixture with dilute acid (e. g. with sulfuric acid, hydrochloric acid, phosphoric acid, acetic acid, etc.), extract the aqueous mixture with ether, dry the ether extract with a dehydrating agent (e. g. anhydrous sodium sulfate) and then subject the dried ether extract to fractional distillation, advantageously under extremely reduced pressure and in the presence of from 0.001% to 0.1% by weight of a polymerization inhibitor (e. g. hydroquinone, trinitrobenzene, etc.). The ortho, para and meta isomers can be separated. The temperature of the reaction can be advantageously maintained from 10° C. up to within a few degrees below the boiling point of the reaction mixture, in the case of the ether containing reaction mixtures from 10° to 30° C. The base compound must be employed in the ratio of at least 2 gram-moles of the base to each gram-mole of the halosulfonylphenylethyl halide, although 5 gram-moles or even higher amounts of the base can be employed to each gram-mole of the halide compound, but no particular advantage is gained by the use of larger excesses.

The intermediate halosulfonylphenyl ethyl halides can be prepared, for example, by reacting alpha- or beta-chloroethylbenzene or alpha- or beta-bromoethylbenzene with a sulfonating agent such as sulfuric acid, oleum, etc., to obtain the intermediate sulfonic acid derivative which can then be converted to the acid chloride with, for example, phosphorus pentachloride, or by sulfonating the haloethyl benzenes with chlorosulfonic acid. For example, β-(p-chlorosulfonylphenyl) ethyl bromide can be readily prepared by reacting 1 gram-mole of β-bromoethylbenzene with from 5 to 10 gram-moles of chlorosulfonic acid. The reaction is carried out at relatively low temperatures, particularly when the reagents are first mixed together. It is preferred in this first stage to maintain the temperature in the range of 0° to 20° C. After the reagents have been mixed, the reaction mixture is allowed to stand at room temperature or under mildly heated condition (30° to 70° C.) for a period of several hours. The mixture is then poured onto crushed ice and extracted with chloroform, carbon tetrachloride, etc., the extract dried over anhydrous sodium sulfate and fractionally distilled under reduced pressure to give separated fractions of β-(p-chlorosulfonylphenyl) ethyl bromide and its ortho and meta isomers. Suitable other halosulfonylphenyl alkyl halide intermediates can be prepared as above-described including the β-(o- and m-chlorosulfonylphenyl) ethyl bromides, the β-(p-, o- and m-chlorosulfonylphenyl) ethyl chlorides, the β-(p-, o- and m-bromosulfonylphenyl) ethyl bromides, the β-(p-, o- and m- bromosulfonylphenyl) ethyl chlorides, the α-(p-, o- and m-chlorosulfonylphenyl) ethyl bromides, the α-(p-, o- and m-chlorosulfonylphenyl) ethyl chlorides, the α-(p-, o- and m-bromosulfonylphenyl) ethyl bromides and the α- (p-, o- and m-bromosulfonylphenyl) ethyl chlorides.

The polymerization of the new alkyl styrene sulfonates alone or conjointly with one or more other unsaturated compounds is accelerated by heat, by actinic light and by polymerization catalysts such as organic peroxides (e. g. benzoyl peroxide, acetyl peroxide, lauroyl peroxide, tertiary butyl hydroperoxide, etc.), hydrogen peroxide, persulfates (e. g. ammonium persulfate, sodium persulfate, potassium persulfate, persulfuric acid, etc.), perborates (e. g. sodium perborate and other alkali metal perborates), the water-soluble salts of percarbonic acid, the water-soluble salts of perphosphoric acid and the water-soluble salts of sulfo-per-acid (Caro's acid). The organic peroxides are especially suitable. Mixture of catalysts can be employed. An activating agent such as sodium bisulfite can be used in conjunction with the polymerization catalysts.

The polymerizations can be carried out in mass or in the presence of an inert solvent such as acetone, methyl ethyl ketone, saturated monohydric alcohols containing from 1 to 4 carbon (e. g. methanol, ethanol, isopropanol, n-propanol, and the butanols), acetonitrile, tetrachloroethylene, benzene, toluene, dimethyl formamide, etc. The monomers can also be dispersed in a nonsolvent for the monomers, the particles of dispersed monomer being very small (emulsion) or relatively large (bead or granular). For emulsion polymerization, any non-solvent for the monomers can be employed, water being especially advantageous. The monomer or mixture of monomers can be advantageously emulsified in the water using emulsifying agents such as salts of higher fatty acids (e. g. sodium or potassium stearate, palmitate, etc.), ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkylnaphthalene sulfonic acids, etc.) and higher molecular weight quaternary ammonium salts (e. g. dimethylbenzylphenyl ammonium chloride, quaternary ammonium salts containing the radicals $C_{15}H_{31}$ and $C_{17}H_{35}$, etc.). For bead or granular polymerization relatively poor dispersing agents, such as starch, methylated starch, gum arabic, polyvinyl alcohol, partly hydrolyzed polyvinyl acetate, gelatin, sodium glycolate and finely divided magnesium carbonate, etc. can be employed. Mixtures of dispersing agents can be employed. In the polymerizations wherein the monomers are dispersed in non-solvents, the dispersions can be facilitated by stirring, shaking or tumbling the polymerization mixtures.

The new monomers can also be copolymerized with one or more other polymerizable unsaturated organic compounds containing the basic vinyl group $CH_2=CH-$ to high molecular weight resins, for example, with vinyl esters of carboxylic acids (e. g. vinyl acetate, vinyl butyrate, vinyl stearate, vinyl trifluoroacetate, vinyl benzoate, etc.), vinyl alkyl ketones (e. g. methyl vinyl ketone, ethyl vinyl ketone, trifluoromethyl vinyl ketone, etc.), vinyl alkyl ethers (e. g. methyl vinyl ether, ethyl vinyl ether, vinyl-β-trifluoroethyl ether, etc.), vinyl sulfonamides (e. g. vinyl sulfonamide, N-methylvinyl sulfonamide, N-ethyl vinyl sulfonamide, etc.), vinyl halides (e. g. vinyl chloride, vinyl bromide and vinyl fluoride), vinyl alkyl sulfones (e. g. vinyl methyl sulfone, vinyl ethyl sulfone, etc.), vinyl urethanes (e. g. vinyl methyl urethane, vinyl ethyl urethane, etc.) cyclic vinyl imides (e. g. vinyl succinimide, vinyl phthalimide, etc.), acrylic acid and its anhydride, amide, N-alkyl amides, nitrile and the methyl, ethyl, butyl, benzyl and phenyl esters, ethylene, propylene, isobutylene, butadienes (e. g. butadiene, α-acetoxybutadiene-1,3, etc.), styrenes (e. g. styrene, o-methyl styrene, p-methyl styrene, 2,4-dichloro-α-methyl styrene, o-acetamino styrene, etc.), and the like. The new monomers can also be copolymerized with one or more other polymerizable unsaturated compounds to high molecular weight resins, for example, with alpha-methacrylonitrile, alpha - acetoxyacrylonitrile, vinylidene dichloride, vinylidene chloride-fluoride, methacrylic acid and its anhydride, amide, N-alkyl amides, nitrile and the methyl, ethyl, butyl, benzyl and phenyl esters, alkyl esters of maleic and fumaric acids such as methyl maleate, methyl fumarate, fumaronitrile, cis- and trans-β-cyano and carboxamidomethyl acrylate, and the like. The polymers and copolymers of the invention are soluble in one or more of the commonly used volatile solvents including acetone, benzene, toluene, acetonitrile, tetrachloroethylene and dimethyl formamide.

The copolymers of the invention can contain variable amounts of each comonomer and are obtained with starting polymerization mixtures containing from 5 to 95% by weight of the new unsaturates and from 95 to 5% by weight of the above-mentioned other unsaturated organic compounds. However, the preferred copolymers contain from 10 to 90% by weight of the new unsaturates and from 90 to 10% by weight of the other unsaturated organic compounds. The proportion of the new alkyl styrene sulfonates employed in the monomeric mixture has been found to be substantially the same in the polymeric material made from such a mixture in accordance with our invention. The temperature of polymerization for the homopolymers and for the copolymers can be varied widely. Where a polymerization activating agent is employed, polymerization can be satisfactorily conducted at as low as 0° C. However, the preferred temperature range for polymerizations, in accordance with the invention is from 25 to 130° C. Where the polymerization is carried out in a solvent or in suspension in a non-solvent, the monomers can advantageously constitute from 5 to 50% by weight of the mixture.

The following examples will serve to illustrate further our new unsaturates, polymers thereof, and the manner of preparing the same.

*Example 1.—Ethyl styrene sulfonate (mixture of isomers)*

12.7 g. of distilled chlorosulfonylphenyl ethyl bromide (consisting of a mixture of ortho, para and a lesser amount of meta isomers) were dissolved in 25 cc. of absolute ether. To this solution, there were added with stirring 20 cc. of absolute ethanol, followed by the addition of 6.3 g. of potassium hydroxide in 25 cc. of absolute ethanol, the temperature being maintained in the range of 20 to 30° C. The mixture was stirred for one hour, filtered and the ethanol and ether removed from the filtrate under reduced pressure. The residual oil obtained was dissolved in 25 cc. of ether, the solution washed successively with 10 cc. of water, 5 cc. of 5 normal sulfuric acid and 10 cc. of water, then dried over anhydrous sodium sulfate, a trace of trinitrobenzene added and distilled through a short column. The ethyl styrene sulfonate

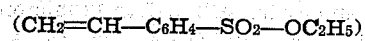

$(CH_2{=}CH{-}C_6H_4{-}SO_2{-}OC_2H_5)$ was collected at 125–128°/1 mm. pressure. The yield of water-white, slightly viscous ethyl styrene sulfonate was 4.5 g., equivalent to 48% of theory. About 4 g. of polymeric material remained in the still pot as a residue.

*Example 2.—Ethyl p-styrene sulfonate*

65 g. of β-(p-chlorosulfonylphenyl)ethyl bromide were dissolved in 150 cc. of ether. To this solution, there were then added 100 cc. of ethanol, followed by the addition of 31.5 g. of potassium hydroxide dissolved in 35 cc. of water, the temperature being maintained in the range of 10 to 20° C. The mixture was stirred for one hour at 25° C. and then filtered. The filtrate was neutralized with 5 normal sulfuric acid and poured into 500 cc. of water. The mixture separated into two layers. The aqueous layer was extracted with two 100 cc. portions of ether, the extracts being then combined with the ether layer, dried over anhydrous sodium sulfate and concentrated at reduced pressure. The residual oil obtained was distilled with a trace of trinitrobenzene added in a molecular still at 7 to 10 microns pressure with a pot temperature of 80° C. The yield of water-white, slightly viscous liquid ethyl p-styrene sulfonate, $(CH_2{=}CH{-}C_6H_4{-}SO_2{-}OC_2H_5)$, was 41.4 g., equivalent to 85% of theory. No appreciable amount of polymer was formed as a residue in the still pot.

In place of ethanol in the above example, there can be substituted an equivalent amount of any of the other saturated monohydroxy alcohols mentioned as being suitable. For example, methanol substituted in the above example in place of the ethanol gives a similarly good yield of high quality methyl p-styrene sulfonate, isopropanol gives similarly isopropyl p-styrene sulfonate, n-butanol gives similarly n-butyl p-styrene sulfonate, n-dodecanol gives similarly n-dodecyl p-styrene sulfonate, etc. By substituting in place of the β-(p-chlorosulfonylphenyl) ethyl bromide in the above example, the same amount of β-(o-chlorosulfonylphenyl) ethyl bromide or β-(m-chlorosulfonylphenyl) ethyl bromide or β-(p-, o- or m-chlorosulfonylphenyl) ethyl chloride or β-(p-, o- or m-bromosulfonylphenyl) ethyl bromide or β-(p-, o- or m-bromosulfonylphenyl) ethyl chloride or α-(p-, o- or m-chlorosulfonylphenyl) ethyl bromide or α-(p-, o- or m-chlorosulfonylphenyl) ethyl chloride or α-(p-, o- or m-bromosulfonylphenyl) ethyl bromide or α-(p-, o- or m-bromosulfonylphenyl) ethyl chloride, the corresponding alkyl para-, ortho- or meta-styrene sulfonates are obtained.

*Example 3.—Methyl p-styrene sulfonate*

65 g. of β-(p-chlorosulfonylphenyl) ethyl bromide were dissolved in 150 cc. of ether and 100 cc. of methanol were added, followed by the addition of 31.5 g. of potassium hydroxide dissolved in 35 cc. of water, the temperature being maintained in the range of 10 to 20° C. The mixture was stirred for one hour at 25° C. and then filtered. The filtrate was neutralized with 5 normal sulfuric acid and then poured into 500 cc. of water. The aqueous layer which separated from the ether layer was extracted with two successive portions of ether, the extracts being then combined with the ether layer, the ether solution dried over anhydrous sodium sulfate and concentrated at reduced pressure. A residual oil was obtained. The oil was distilled with a trace of trinitrobenzene in a molecular still at 7 to 10 microns pressure with a pot temperature of 65° C. The yield of water-white, slightly viscous liquid methyl p-styrene sulfonate

was equivalent to approximately 85% of theory.

*Example 4.—n-Butyl p-styrene sulfonate*

31.2 g. of β-(p-chlorosulfonylphenyl) ethyl bromide were dissolved in 40 cc. of ether and 20 cc. of n-butanol added, followed by the addition of a solution of 14 g. of potassium hydroxide in 15 cc. of water at 10° to 15° C. The mixture was stirred at 20° to 30° C. for a period of 2 hours, then poured into 400 cc. of water, the resulting mixture neutralized with 5 normal sulfuric acid and extracted with three 50 cc. portions of ether. The ether extracts were combined, dried over anhydrous sodium sulfate and distilled with a trace of trinitrobenzene added in a short path still at 90° C. and at a pressure of 7 to 14 microns. The yield of water-white, viscous liquid n-butyl p-styrene sulfonate

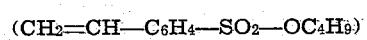

was 22 g., equivalent to 83% of theory.

In place of the β-(p-chlorosulfonylphenyl)-ethyl bromide in the above example, there can be substituted the same amount of β-(o-chlorosulfonylphenyl) ethyl bromide or β-(m-chlorosulfonylphenyl) ethyl bromide or β-(p-, o- or m-chlorosulfonylphenyl) ethyl chloride or β-(p-, o- or m-bromosulfonylphenyl) ethyl bromide or β-(p-, o- or m-bromosulfonylphenyl) ethyl chloride or α-(p-, o- or m-chlorosulfonylphenyl) ethyl bromide or α-(p-, o- or m-chlorosulfonylphenyl) ethyl chloride or α-(p-, o- or m-bromosulfonylphenyl) ethyl bromide or α-(p-, o- or m-bromosulfonylphenyl) ethyl chloride, to obtain similarly good yield of high quality n-butyl para-, ortho- and meta-styrene sulfonates.

*Example 5.—n-Octyl p-styrene sulfonate*

31.2 g. of β-(p-chlorosulfonylphenyl) ethyl bromide were dissolved in 50 cc. of ether and to this solution there were added 25 cc. of n-octanol and then 14 g. of potassium hydroxide dissolved in 15 cc. of water at 10° to 20° C. The mixture was stirred for one hour at 20° to 25° C., then poured into 400 cc. of water, the resulting mixture neutralized with 5 normal sulfuric acid and extracted three times with 50 cc. portions of ether. The ether extracts were combined, dried over anhydrous sodium sulfate and distilled with a trace of trinitrobenzene added in a short path still at 110° C. and at a pressure of 10 microns. The yield of water-white, viscous liquid n-octyl p-styrene sulfonate.

was 30 g., equivalent to 92% of theory.

*Example 6.—Poly ethyl p-styrene sulfonate*

2 g. of ethyl p-styrene sulfonate and 0.02 g. of acetyl peroxide were mixed together and then heated in an atmosphere of nitrogen for a period of 48 hours at a temperature of 30° C. A hard, clear resin with a softening point above 140° C. was obtained. The polymer was soluble in acetone.

By proceeding as described in the above example, other homopolymers can be prepared from the new unsaturates, for example, poly methyl p-styrene sulfonate, poly methyl o-styrene sulfonate, poly methyl m-styrene sulfonate, poly ethyl o-styrene sulfonate, poly ethyl m-styrene sulfonate, poly isopropyl p-styrene sulfonate, poly isopropyl o-styrene sulfonate, poly isopropyl m-styrene sulfonate, poly n-butyl p-styrene sulfonate, poly n-butyl o-styrene sulfonate, poly n-octyl p-styrene sulfonate, poly n-octyl o-styrene sulfonate, etc. The homopolymers above-mentioned are soluble in one or more of the common volatile solvents such as acetone, acetonitrile, toluene, chlorobenzene, dimethyl formamide, and similar solvents. The properties of the homopolymers range from hard, clear and high softening points in the case of the methyl and ethyl esters to being tough and rubbery with slightly lower softening points in the case of the butyl, octyl and higher alkyl esters. In general, as the carbon chain length of the alkyl group increases the polymers become more rubbery, the softening points progressively lower and the toughness increases.

*Example 7.—Copolymer of ethyl p-styrene sulfonate and methyl methacrylate*

1 g. of ethyl p-styrene sulfonate, 1 g. of methyl methacrylate and 0.02 g. of acetyl peroxide were mixed together and heated at 60° C. for 48 hours. A hard, clear polymer soluble in acetone was obtained.

*Example 8.—Copolymer of ethyl p-styrene sulfonate and acrylonitrile*

1 g. of ethyl p-styrene sulfonate, 1 g. of acrylonitrile and 0.02 g. of acetyl peroxide were mixed together and heated at 60° C. for a period of 48 hours. A hard, clear polymer soluble in dimethyl formamide was produced.

*Example 9.—Copolymer of ethyl p-styrene sulfonate and styrene*

1 g. of ethyl p-styrene sulfonate, 1 g. of styrene and 0.02 g. of acetyl peroxide were mixed together and heated at 60° C. for a period of 48 hours. A hard, clear polymer soluble in toluene resulted.

*Example 10.—Copolymer of ethyl p-styrene sulfonate and vinyl acetate*

1 g. of ethyl p-styrene sulfonate, 1 g. of vinyl acetate and 0.02 g. of acetyl peroxide were mixed together and heated at 60° C. for 48 hours. A gummy polymer soluble in acetone was produced.

*Example 11.—Copolymer of ethyl p-styrene sulfonate and N-methyl methacrylamide*

1 g. of ethyl p-styrene sulfonate, 1 g. N-methyl methacrylamide and 0.02 g. of acetyl peroxide were mixed together and heated at 60° C. for 48 hours. A hard, clear polymer soluble in dimethyl formamide was obtained.

*Example 12.—Copolymer of ethyl p-styrene sulfonate and alpha-acetoxy acrylonitrile*

1 g. of ethyl p-styrene sulfonate, 1 g. of alpha-acetoxy acrylonitrile and 0.02 g. of acetyl peroxide were mixed together and heated at 60° C. for 48 hours. A hard, clear polymer soluble in dimethyl formamide resulted.

*Example 13.—Copolymer of n-butyl p-styrene sulfonate and acrylonitrile*

2 g. of n-butyl p-styrene sulfonate, 4 g. of acrylonitrile, 0.04 g. of ammonium persulfate and 0.1 g. of sodium bisulfite were mixed together in 45 cc. of distilled water. The polymerization started immediately and was complete after several hours at 60° C. The white polymer obtained as a precipitate was filtered out, washed with water and dried. It was soluble in dimethyl formamide.

*Example 14.—Copolymer of isopropyl p-styrene sulfonate and styrene*

1 g. of isopropyl p-styrene sulfonate, 2 g. of styrene, 0.5 cc. of 10% hydrogen peroxide, 0.5 cc. of 6 normal sulfuric acid and 0.1 g. of $FeSO_4.7H_2O$ were mixed together in 45 cc. of distilled water. The polymerization started immediately and was complete in a few hours. The white polymer precipitated out of solution and was filtered out, washed with water and dried. It was soluble in toluene.

*Example 15.—Copolymer of methyl p-styrene sulfonate and methyl methacrylate*

A. 1 g. of methyl p-styrene sulfonate, 2 g. of methyl methacrylate were emulsified in 10 cc. of water using 0.1 g. of polyvinyl alcohol as the emulsifying agent and then polymerized by adding 0.02 g. of ammonium persulfate and heating the mixture at 60° to 70° C. for a period of 15 hours. At the end of this time, the mixture was acidified with dilute acetic acid. The white polymer which precipitated was filtered out, washed with water and alcohol and dried. It was soluble in acetone.

B. 0.2 g. of methyl p-styrene sulfonate, 2 g. of methyl methacrylate were polymerized following the procedure of above Example 15A. The white polymer obtained as a precipitate contained 10% by weight of methyl p-styrene sulfonate, the remainder being methyl methacrylate. The polymer was soluble in acetone.

*Example 16.—Copolymer of n-butyl p-styrene sulfonate and styrene*

A. 3 g. of n-butyl p-styrene sulfonate, 1 g. of styrene and 0.004 g. of benzoyl peroxide were mixed together and heated at 80° C. for a period of 48 hours. A clear, rubbery resin which was soluble in acetone was obtained. This polymer contained 75% by weight of n-butyl p-styrene sulfonate, the remainder being styrene.

B. 4.5 g. of n-butyl p-styrene sulfonate, 0.5 g. of styrene and 0.005 g. of benzoyl peroxide were mixed together and heated at 80° C. for 48 hours. A clear, rubbery resin which was soluble in acetone was obtained. This polymer contained 90% by weight of n-butyl p-styrene sulfonate, the remainder being styrene.

Proceeding as shown in the foregoing examples, other copolymers can be prepared, for example, from monomeric mixtures containing 5% by weight of one or more of the new alkyl styrene sulfonates, 20% by weight of one or more of the new alkyl styrene sulfonates, 40% by weight of one or more of the new alkyl styrene sulfonates, 60% by weight of one or more of the new alkyl styrene sulfonates and 95% by weight of one or more of the new alkyl styrene sulfonates, the remainder being one or more of the other unsaturated organic mentioned as suitable for preparing copolymers with the new alkyl styrene sulfonates of the invention.

As indicated previously, the homopolymers and copolymers prepared in accordance with the invention are all soluble in one or more of the common volatile solvents to viscous dope solutions. While plasticizers can be added, fillers, conditioning agents, dyes, etc., depending on the intended use of the dopes, the addition of plasticizer for most purposes is not necessary because the alkyl sulfonate group appears to function as an internal plasticizer, and as a result, it is possible to obtained extremely tough and flexible polymers which have a high softening point. From such viscous dopes, the polymers can be extruded through a spinneret into a cabinet or cell where the solvent is evaporated to give monofilaments which can be spun into yarn. Such dopes can also be coated on a film forming surface of metal or glass, the solvent evaporated and the resulting film stripped from the film-forming surface. The new polymers can also be molded, with or without plasticizers, fillers, coloring matter, etc., by means of extrusion, injection or compression methods into shaped objects which can be worked into finished form by heat and mechanical means.

What we claim is:

1. An alkyl styrene sulfonate having the general structural formula:

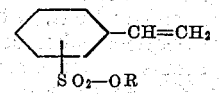

wherein R represents an alkyl group containing from 1 to 18 carbon atoms.

2. An alkyl styrene sulfonate having the general structural formula:

wherein R represents an alkyl group containing from 1 to 18 carbon atoms.

3. An alkyl styrene sulfonate having the general structural formula:

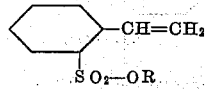

wherein R represents an alkyl group containing from 1 to 18 carbon atoms.

4. An alkyl styrene sulfonate having the general structural formula:

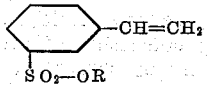

wherein R represents an alkyl group containing from 1 to 18 carbon atoms.

5. Methyl p-styrene sulfonate.
6. Ethyl p-styrene sulfonate.
7. n-Butyl p-styrene sulfonate.
8. A process for preparing an alkyl styrene sulfonate having the general structural formula:

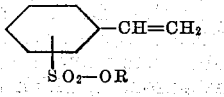

wherein R represents an alkyl group containing from 1 to 18 carbon atoms, comprising reacting a halide compound having the general formula:

$$X-SO_2-C_6H_4-C_2H_4-X$$

wherein X represents a halogen atom selected from the group consisting of an atom of chlorine and an atom of bromine, with a saturated monohydroxy aliphatic alcohol containing from 1 to 18 carbon atoms, in the presence of a base compound selected from the group consisting of an alkaline salt of the alkali metal series, an alkaline salt of the alkaline earth series and an organic tertiary amine, the said base compound being present in the ratio of at least 2 gram-moles of the base compound to each gram-mole of the said halide compound, and separating the alkyl styrene sulfonate, which forms, from the reaction mixture.

9. A process for preparing an alkyl p-styrene sulfonate having the general structural formula:

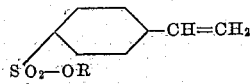

wherein R represents an alkyl group containing from 1 to 18 carbon atoms, comprising reacting a halide compound having the general formula:

wherein X represents a halogen atom selected from the group consisting of an atom of chlorine and an atom of bromine and wherein the X—SO$_2$— group is attached to the para carbon atom of the benzene nucleus, with a saturated monohydroxy aliphatic alcohol containing from 1 to 18 carbon atoms, in the presence of a base compound selected from the group consisting of an alkaline salt of the alkali metal series, an alkaline salt of the alkaline-earth series and an organic tertiary amine, the said base compound being present in the ratio of at least 2 gram-moles of the base compound to each gram-mole of the said halide compound, and separating the alkyl p-styrene sulfonate, which forms, from the reaction mixture.

10. A process for preparing an alkyl styrene sulfonate having the general structural formula:

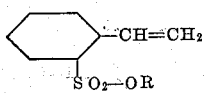

wherein R represents an alkyl group containing from 1 to 18 carbon atoms, comprising reacting a halide compound having the general formula:

wherein X represents a halogen atom selected from the group consisting of an atom of chlorine and an atom of bromine and wherein the X—SO$_2$— group is attached to an ortho carbon atom of the benzene nucleus, with a saturated monohydroxy aliphatic alcohol containing from 1 to 18 carbon atoms, in the presence of a base compound selected from the group consisting of an alkaline salt of the alkali metal series, an alkaline salt of the alkaline earth series and an organic tertiary amine, the said base compound being present in the ratio of at least 2 gram-moles of the base compound to each gram-mole of the said halide compound, and separating the alkyl o-styrene sulfonate, which forms, from the reaction mixture.

11. A process for preparing an alkyl styrene sulfonate having the general structural formula:

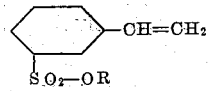

wherein R represents an alkyl group containing from 1 to 18 carbon atoms, comprising reacting a halide compound having the general formula:

wherein X represents a halogen atom selected from the group consisting of an atom of chlorine and an atom of bromine and wherein the X—SO$_2$— group is attached to a meta carbon atom of the benzene nucleus, with a saturated monohydroxy aliphatic alcohol containing from 1 to 18 carbon atoms, in the presence of a base compound selected from the group consisting of an alkaline salt of the alkali metal series, an alkaline salt of the alkaline earth series and an organic tertiary amine, the said base compound being present in the ratio of at least 2 gram-moles of the base compound to each gram-mole of the said halide compound, and separating the alkyl m-styrene sulfonate, which forms, from the reaction mixture.

12. A process for preparing methyl p-styrene sulfonate comprising reacting β-(p-chlorosulfonylphenyl)ethyl bromide with methanol in the presence of at least 2 gram-moles of potassium hydroxide to each gram-mole of the β-(p-chlorosulfonylphenyl)ethyl bromide and separating the methyl p-styrene sulfonate, which forms, from the reaction mixture.

13. A process for preparing ethyl p-styrene sulfonate comprising reacting β-(p-chlorosulfonylphenyl)ethyl bromide with ethanol in the presence of at least 2 gram-moles of potassium hydroxide to each gram-mole of the β-(p-chlorosulfonylphenyl)ethyl bromide and separating the ethyl p-styrene sulfonate, which forms, from the reaction mixture.

14. A process for preparing n-butyl p-styrene sulfonate comprising reacting β-(p-chlorosulfonylphenyl)ethyl bromide with n-butanol in the presence of at least 2 gram-moles of potassium hydroxide to each gram-mole of the β-(p-chlorosulfonylphenyl)ethyl bromide and separating the n-butyl p-styrene sulfonate, which forms, from the reaction mixture.

HARRY W. COOVER, JR.
JOSEPH B. DICKEY.

REFERENCES CITED

The following references are of record in the file of this patent:

UNITED STATES PATENTS

| Number | Name | Date |
| --- | --- | --- |
| 2,452,536 | Kirk | Nov. 2, 1948 |
| 2,527,300 | Dudley | Oct. 24, 1950 |